(12) United States Patent
Seki et al.

(10) Patent No.: US 9,990,415 B2
(45) Date of Patent: Jun. 5, 2018

(54) DATA STRUCTURE FOR REPRESENTING INFORMATION USING EXPRESSIONS

(71) Applicant: Maeda Corporation, Tokyo (JP)

(72) Inventors: Yoichi Seki, Tokyo (JP); Tosiyasu Kunii, Tokyo (JP); Toshio Kodama, Tokyo (JP); Kimio Momose, Tokyo (JP)

(73) Assignee: Maeda Corporation, Tokyo (JP)

( * ) Notice: Subject to any disclaimer, the term of this patent is extended or adjusted under 35 U.S.C. 154(b) by 0 days. days.

(21) Appl. No.: 15/309,872

(22) PCT Filed: May 8, 2015

(86) PCT No.: PCT/JP2015/063390
§ 371 (c)(1),
(2) Date: Nov. 9, 2016

(87) PCT Pub. No.: WO2015/170770
PCT Pub. Date: Nov. 12, 2015

(65) Prior Publication Data
US 2017/0270187 A1    Sep. 21, 2017

(30) Foreign Application Priority Data

May 9, 2014   (JP) ................................. 2014-097501

(51) Int. Cl.
*G06F 17/30*    (2006.01)
(52) U.S. Cl.
CPC .. *G06F 17/30604* (2013.01); *G06F 17/30312* (2013.01); *G06F 17/30339* (2013.01); *G06F 17/30498* (2013.01)
(58) Field of Classification Search
CPC ................................................ G06F 17/30312
See application file for complete search history.

(56) References Cited

U.S. PATENT DOCUMENTS

| | | | |
|---|---|---|---|
| 2007/0276664 A1* | 11/2007 | Khosla | G10L 15/193 704/257 |
| 2010/0146494 A1* | 6/2010 | Gellerich | G06F 8/37 717/143 |

FOREIGN PATENT DOCUMENTS

| | | |
|---|---|---|
| CN | 103475905 A | 12/2013 |
| JP | 4343984 B2 | 10/2009 |

(Continued)

OTHER PUBLICATIONS

International Search Report in International Application No. PCT/JP2015/063390 dated Jul. 14, 2015, 1 page.

(Continued)

*Primary Examiner* — Grace Park
(74) *Attorney, Agent, or Firm* — Marshall, Gerstein & Borun LLP

(57) ABSTRACT

An information processing device processes target information described using identifiers formed from a symbol, a product operator that joins together factors containing one or more of the identifiers and thereby forms a string of ordered factors, and a sum operator that joins together terms containing one or more of the factors and thereby forms an expression that is a combination of the terms. Also, information processing device includes a dividing unit that divides the target information into a plurality of terms at a predetermined position; and a transmission unit that associates positional information with at least any of the factors contained in the terms resulting from the division and causes each of the terms resulting from the division to be held in any of a plurality of server devices, where the positional information contains an occurrence sequence of the terms in the target information and an occurrence sequence of the factors in the terms.

8 Claims, 14 Drawing Sheets

EXPRESSION

(56) References Cited

FOREIGN PATENT DOCUMENTS

| JP | 5113779 B2 | 1/2013 |
| JP | 5357286 B2 | 12/2013 |
| WO | WO-2007/088982 A2 | 8/2007 |
| WO | WO-2012/023192 A1 | 2/2012 |
| WO | WO-2013/042230 A1 | 3/2013 |

OTHER PUBLICATIONS

International Preliminary Report on Patentability and Written Opinion in International Application No. PCT/JP2015/063390 dated Nov. 15, 2016, 4 pages.
Extended European Search Report in EP Application No. 15788652.4 dated Sep. 5, 2017, 8 pages.
Search Report in CN Application No. 201580024644.7 dated Sep. 8, 2017, 3 pages.
Office Action in CN Application No. 201580024644.7 dated Apr. 16, 2018, 13 pages.

* cited by examiner

NORMALIZED TABLE STRUCTURE

TABLE ID

| A | B | C | D | E |
|---|---|---|---|---|
| a1 | b1 | c1 | d1 | e1 |
| a2 | b2 | c2 | d2 | e2 |
| a3 | b3 | c3 | d3 | e3 |
| ... | ... | ... | ... | ... |
| ... | ... | ... | ... | ... |
| ... | ... | ... | ... | ... |

TABLE ID  X $(A\{\varepsilon+B+C+D+E\}\{a1\{\varepsilon+b1+c1+d1+e1\}+a2\{\varepsilon+b2+c2+d2+e2\}+a3\{\varepsilon+b3+c3+d3+e3\}+...\})$

*** PRESENTATION FORM 1

FIG.5

| ABSOLUTE POSITIONAL INFORMATION | VALUE |
|---|---|
| ⟨1×1⟩ | A |
| (1×2)⟨1×1⟩ | B |
| (1×2)⟨2×1⟩ | C |
| (1×2)(2×2)⟨1×1⟩ | D |
| (1×2)(2×2)⟨2×1⟩ | E |
| ⟨2×1⟩ | F |
| (2×2)⟨1×1⟩ | G |
| (2×2)⟨2×1⟩ | H |

FIG.10A

| Key | Value |
|---|---|
| ⟨1×1⟩ | GERMANY (EXPRESSION 1) + FRANCE (EXPRESSION 2) |

FIG.10B

| Key | Value |
|---|---|
| ⟨2×1⟩ | (JAPAN (EXPRESSION 3) + GERMANY (EXPRESSION 4) + FRANCE (EXPRESSION 5) + JAPAN (EXPRESSION 6) + GERMANY (EXPRESSION 7) + FRANCE (EXPRESSION 8) + JAPAN (EXPRESSION 9) + ...) |

FIG.11A

| Key | Value |
|---|---|
| ⟨1×1⟩ | (GERMANY (EXPRESSION 1) + FRANCE (EXPRESSION 2) + JAPAN (EXPRESSION 3) + GERMANY (EXPRESSION 4)) |

FIG.11B

| Key | Value |
|---|---|
| ⟨2×1⟩ | (FRANCE (EXPRESSION 5) + JAPAN (EXPRESSION 6) + GERMANY (EXPRESSION 7) + FRANCE (EXPRESSION 8)) |

FIG.11C

| Key | Value |
|---|---|
| ⟨3×1⟩ | (JAPAN (EXPRESSION 9) + ...) |

FIG.12A

| Key | Value |
| --- | --- |
| GERMANY | ⟨1 × 2⟩ (EXPRESSION 1) + ⟨4 × 2⟩ (EXPRESSION 4) + ⟨7 × 2⟩ (EXPRESSION 7) |

FIG.12B

| Key | Value |
| --- | --- |
| FRANCE | ⟨2 × 2⟩ (EXPRESSION 2) + ⟨5 × 2⟩ (EXPRESSION 5) + ⟨8 × 2⟩ (EXPRESSION 8) |

FIG.12C

| Key | Value |
| --- | --- |
| JAPAN | ⟨3 × 2⟩ (EXPRESSION 3) + ⟨6 × 2⟩ (EXPRESSION 6) + ⟨9 × 2⟩ (EXPRESSION 9) |

DATA STRUCTURE FOR REPRESENTING INFORMATION USING EXPRESSIONS

TECHNICAL FIELD

The present invention relates to an information processing device, an information processing method, and a program.

BACKGROUND ART

Conventionally known data structures handled by computers include, for example, tabular structures of relational databases, objects of object-oriented databases, and frames or rules of knowledge databases.

However, databases proposed conventionally have a problem in terms of flexibility toward changes, being unable to add a new structure to a defined data structure. For example, when a new attribute is added to one table after a relational database goes into operation, it is necessary to modify an existing data structure and an application program that processes the data structure, and man-hours needed for the modification are burdens on computer users and administrators or application program developers. Also, with conventional relational databases, it is not possible to hierarchically describe information, i.e., for example, define a table further in an attribute of a table. On the other hand, with an object-oriented database or frame, a so-called parent-child relationship can be defined between objects or between frames, but conversely the object-oriented database is sometimes unfit for responding to a demand to process a relationship between an attribute and attribute value in a simple manner.

Thus, in order to allow an information processing device to handle information about things, organizations, persons, and the like handled by a user or concepts and the like handled by the user, the present applicant has proposed a new data structure used to describe information and a procedure for processing information stored in the data structure (see Patent documents 1 to 4). According to this proposal, information is expressed by expression-based representations, i.e., for example, by a sum of an identifier and identifier, a product of an identifier and identifier, a sum of products of an identifier and identifier, and the like.

CITATION LIST

Patent Document

[Patent document 1] Japanese Patent No. 4343984
[Patent document 2] Japanese Patent No. 5113779
[Patent document 3] Japanese Patent No. 5357286
[Patent document 4] International Publication WO 2012/023192

SUMMARY OF INVENTION

Problems to be Solved by the Invention

Incidentally, the above-mentioned proposed technique, which continuously describes to-be-processed information in text format is suitable for sequential access. On the other hand, there is a problem in that processing time increases with increases in held information. Thus, a technique according to the present application is a processing technique for information described by a data structure proposed by the applicants and is intended to divide to-be-processed information under predetermined conditions.

Means for Solving the Problems

According to one aspect of the present invention, there is provided an information processing device that processes target information described using identifiers formed from a symbol, a product operator that joins together factors containing one or more of the identifiers and thereby forms a string of ordered factors, and a sum operator that joins together terms containing one or more of the factors and thereby forms an expression that is a combination of the terms. The information processing device includes a dividing unit that divides the target information into a plurality of terms at a predetermined position; and a transmission unit that adds positional information to at least any of the factors included in the terms resulting from the division and causes each of the terms resulting from the division to be held in any of a plurality of server devices, where the positional information contains an occurrence sequence of the terms in the target information and an occurrence sequence of the factors in the terms.

This makes it possible to divide target information described by the above-mentioned data structure in a restorable form and store the information in plural server devices in a distributed manner. Note that subsets of the divided target information may be processed in parallel on the respective server devices.

Also, the target information may have a hierarchical structure that includes the expression as the factors in a nested manner, the expression being demarcated by ordered factor constructor operators that relate combinations of the terms to one another by preserving ordering or assembly factor constructor operators that relate combinations of the terms to one another without preserving ordering; and the predetermined position may be any of portions demarcated by the sum operator outside the expression demarcated by the ordered factor constructor operators. Consequently, in concrete terms, the ordering to be preserved in the above-mentioned data structure can be divided in a restorable form.

Also, the information processing device may further includes a joining unit that receives the terms resulting from the division from the plurality of server devices, respectively, joins together the terms in ascending order of the occurrence sequence of the terms and in ascending order of the occurrence sequence of the factors based on the positional information, and thereby generates the target information. The joining unit makes it possible to restore the divided target information.

Also, position expressions held by the respective server devices may be divided at a position specified by a user, the position expression held by each of the server devices may be divided at such a position that subsets resulting from the division are within a predetermined size, or the position expression held by each of the server devices may be divided into subsets of terms, the terms in each of the subsets having in common a predetermined factor connected by the product operator.

Contents of Means for solving the Problems described above may be combined as much as possible without departing from the problem and the technical idea of the present invention. Also, the invention may provide a method by which the information processing device executes the means described above or a program that makes a computer execute the means. Also, the program may be provided by being recorded on a computer-readable recording medium.

The computer-readable recording medium is a recording medium that accumulates information by electrical, magnetic, optical, mechanical, or chemical action and that can be read by a computer. Among such recording media, examples of recording media removable from the computer includes an optical disk, a magneto-optical disk, a flexible disk, a magnetic tape, and a memory card. Also, examples of recording media fixedly mounted on the computer includes HDD (Hard Disk Drive), SSD (Solid State Drive), and ROM (Read Only Memory).

Effects of the Invention

Using the processing technique for information described by the data structure proposed by the applicants, the present invention allows to-be-processed information to be divided under predetermined conditions.

BRIEF DESCRIPTION OF THE DRAWINGS

FIG. 5 is a diagram illustrating by example a table that stores a schematic position expression in KVS format.

FIG. 10A is a diagram illustrating an example of a table that stores subsets of target information in KVS format.

FIG. 10B is a diagram illustrating an example of a table that stores subsets of target information in KVS format.

FIG. 11A is a diagram illustrating an example of a table that stores subsets of target information in KVS format.

FIG. 11B is a diagram illustrating an example of a table that stores subsets of target information in KVS format.

FIG. 11C is a diagram illustrating an example of a table that stores subsets of target information in KVS format.

FIG. 12A is a diagram illustrating an example of a table that stores subsets of target information in KVS format.

FIG. 12B is a diagram illustrating an example of a table that stores subsets of target information in KVS format.

FIG. 12C is a diagram illustrating an example of a table that stores subsets of target information in KVS format.

MODE FOR CARRYING OUT THE INVENTION

An information processing device according to a mode for carrying out the present invention (also referred to as an "embodiment") will be described below with reference to the drawings. A configuration of the following embodiment is provided by way of example, and the present invention is not limited to the configuration of the embodiment.

According to the present embodiment, the information processing device handles information about things, organizations, persons, and the like. Such information, when expressed in a format processable by the information processing device according to the present embodiment, is referred to as target information. A data structure used to describe the target information and procedures for processing the target information described by the data structure will be depicted below.

(Data Structure)

The data structure refers to a structure used to describe target information. Note that the target information is generated, stored, read, updated (referred to as "operation"), deleted, and so on by the information processing device equipped with a processor and storage device.

(1) Components of Target Information

Figure 1:
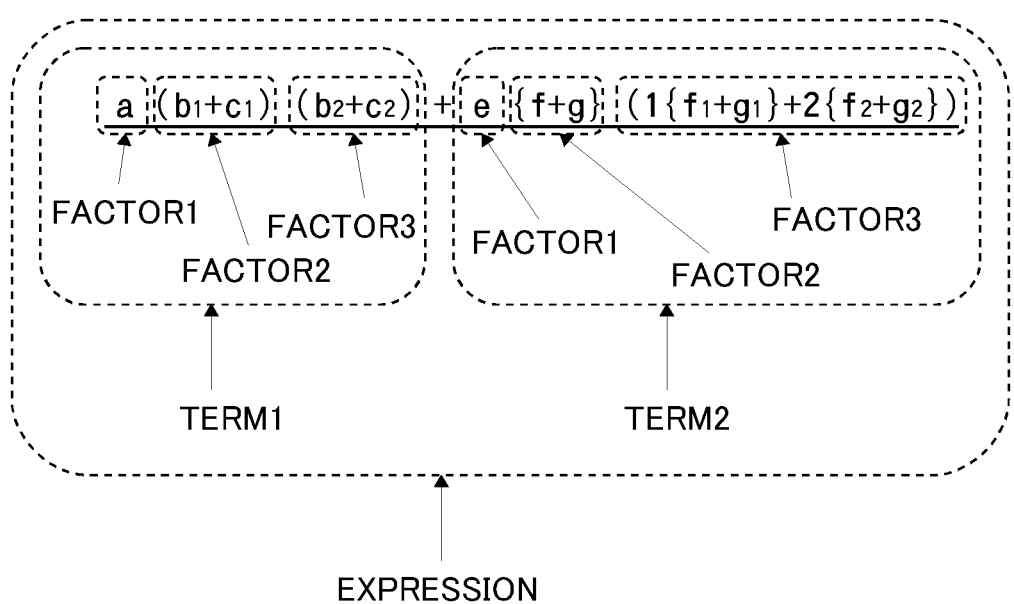
FIG. 1 is a diagram for describing expression-based representation.

The information processing device maintains the target information in the form of an expression. A representation method using an expression according to the present embodiment is also referred to as "the expression-based representation." FIG. 1 is a diagram illustrating an example of the expression. The expression contains one or more identifiers (also referred to as the base elements), where the identifier is a minimum constituent unit. The identifier according to the present embodiment does not necessarily provides information capable of uniquely identifying data. Furthermore, the expression is described using predetermined symbols. Operators and delimiters are used as the predetermined symbols. Specifically, a sum operator "+", a product operator "×" (which may be omitted as illustrated in FIG. 1), first parentheses "(" and ")" (round brackets), and second parentheses "{" and "}" (braces) are used. The first parentheses correspond to assembly factor constructor operators (also referred to as combination part delimiters) according to the present invention. Also, the second parentheses correspond to ordered factor constructor operator (also referred to as permutation part delimiters) according to the present invention.

Also, the identifier is a minimum unit making up target information and is represented by a symbol. Available symbols include character strings of alphanumeric characters as well as special characters (excluding, however, the sum operator "+", product operator "×", first parentheses "(" and ")", and second parentheses "{" and "}").

According to the present embodiment, available special characters include "Φ" and "ε". Φ is an identifier that represents a value of zero 0, a value that does not change a result of an operation produced by the sum operator, or an empty set. According to the present embodiment, Φ is also referred to as a "zero element." Also, ε is a value of 1 or a value that does not change a result of an operation carried out using the product operator. According to the present embodiment, ε is also referred to as a "unit element." Note that Φ is sometimes referred to as a unit element of a sum operation, but is referred to as a zero element in the present embodiment.

Also, as illustrated in FIG. 1, a portion (or the whole) described by an identifier and a predetermined symbol is referred to as a "factor." Besides, a portion described by a product of factors is referred to as a "term." Furthermore, a portion described by a sum of terms is an expression. In other words, the expression contains one or more terms connected by the sum operator. Also, the term contains one or more factors connected by the product operator. Furthermore, factors in a nested form may sometimes be described as an expression. Note that "a," "b1," and "c1" in FIG. 1 are identifiers, where the identifier is a minimum unit making up target information.

According to the present embodiment, expressions that represent target information are generated, based on the following rules (a) to (d).

(a) The identifier, unit element, and zero element are all expression-based representations (expressions).

(b) If both r and s are expression-based representations, r+s is also an expression-based representation.

(c) If both r and s are expression-based representations, r×s is also an expression-based representation. Here, regarding associative strength of operations, r×s is stronger than r+s as with general algebra.

(d) If r is an expression-based representation, (r) and {r} are also expression-based representations.

(2) Algebraic Structure of Expression-Based Representation

According to the present embodiment, expression-based representations r, s, and t have the following algebraic properties (a) to (f).

(a) Associative Law $$r+(s+t)=(r+s)+t;$$

$$r\times(s\times t)=(r\times s)\times t;$$

(b) Commutative Law $$r+s=s+r;$$

Note that in the expression-based representation according to the present embodiment, the commutative law for the product operator does not hold. Therefore, when plural factors are joined by the product operator, positions of the individual factors have information (or meaning). That is, the factor has a function of a so-called positional parameter whose position has been specified. The fact that "the commutative law for the product operator does not hold" corresponds to the fact that the product operator according to the present invention "joins plural identifiers into a string of ordered factors."

(c) Unit Element of Multiply Operation $$r\times\epsilon=\epsilon\times r=r;$$

(d) Zero Elements of Multiply Operation and Add Operation $$r\times\epsilon=\epsilon\times r=\Phi;$$

$$r+\Phi=r;$$

(e) Distributive Law $$r\times(s+t)=r\times s+r\times t;$$

$$(r+s)\times t=r\times t+s\times t;$$

$$(f)\{r+s\}\times\{t+u\}=\{r\times t+s\times u\};$$

Also, the target information represented by an expression can be represented by plural levels differing in an abstraction level. For example, as the processor executes a predetermined program according to the present invention, a level of representation of the target information can be changed. The plural levels include, for example, a set theoretical level at which the abstraction level of the target information is expressed as being the highest, a topological space level at which the abstraction level of the target information is lower than at the set theoretical level and the target information is expressed by using subsets as elements, an adjunction space level at which the abstraction level of the target information is lower than at the topological space level and pieces of the target information at the topological space level are attached to each other, and a cellular space level at which the abstraction level of the target information is lower than at the adjunction space level and the target information in the topological space is expressed as having a predetermined attribute.

(3) Set-Information

Set-information is defined as a combination of terms or a sum of terms. Here, each term is defined as a product of an identifier serving as a set ID (that corresponds to a first identification factor according to the present invention) and an identifier serving as a value, i.e., defined as a set ID×a value. However, the value may be the product of plural identifiers. The expression-based representation of information about a set is typically as follows.

EXAMPLE

Set ID×value 1+set ID×value 2+ . . .

As described above, with the data structure according to the present embodiment, since the commutative law holds for the sum operator, set-information can be said to be a combination of unordered terms. On the other hand, positional relationships among the factors making up terms are maintained. In the example illustrated in FIG. 1, for example, factor 1 included in term 1 and term 2 corresponds to a set ID.

The function to maintain the positional relationships among the factors achieves an extremely great effect in expressing a thing or concept on a computer. Generally, the commutative law does not hold for a modification relation that describes a thing or concept. For example, "the disk of Kodama" differs in meaning from "Kodama of the disk." The factor and product operator according to the present embodiment makes it possible to give description by simplifying such modification relations. Furthermore, if the terms described using such modification relations are combined by the sum operator, sets of things or sets of concepts can be described to build a database of a simple form. Furthermore, when the thing or concept to be managed are managed as a set of terms, meanings can be given to positional relationships among the factors in the term.

Also, it may be said that each of the factors making up the term has significance as a so-called positional parameter. For example, set-information such as illustrated below is considered.

EXAMPLE

Fruit×any shape×any color×banana+fruit×any shape× any color×apple+fruit×elongated×yellow×banana+fruit×round×red×apple In this case, the first factor of the term is fruit, which is a set ID, the second factor indicates a shape, the third factor indicates a color, and the fourth factor indicates a name. In this way, if factors are used by imposing semantic restrictions at a position of each factor, a relationship between an attribute and attribute value can be processed at the set theoretical level as well. The set-information can freely define attributes of a thing using ordered factors.

Also, all information including information about things and a set of persons are expressed on a computer by a combination of terms containing factors such as described above.

EXAMPLES $A \times a1 + A \times a2 + A \times a3$, $b1 \times B + b2 \times B \times B$, fruit×apple+
fruit×banana+fruit×mandarin orange, veg-
etables×cabbage+vegetables×cucumber+veg-
etables×burdock, employee×$A$+employee×$B$+
employee×$C$ That is, the set-information describes a combination of terms belonging to a set identified by a set ID. In the above example, when employee C resigns "employee×C" is deleted together with the sum operator. Furthermore, when employee D and employee E enter the company, "employee×D+employee×E" is further connected by a sum operator.

(4) Topological Space Information

The topological space information is described by the product of an identifier serving as a topological ID and the sum of subsets. That is, the topological ID×(the sum of subsets). Here, the subset is expressed by the product of a subset ID that identifies a subset and the sum of terms included in the subset. That is, the subset ID×(the sum of terms). However, the terms may further include sums of terms combined using first parentheses "( )" or second parentheses "{ }" or the product of the sums. In the example of FIG. 1, for example, factor 2 of term 2 corresponds to the topological ID. Also, factor "1" and factor "2" included in factor 3 of term 2 correspond to subset IDs.

Examples of topological space information are illustrated below (in the following examples, the comma "," is a delimiter of examples rather than a component of the expression).

EXAMPLES $T \times (ABC \times (ab1+ac2+bc3)+A \times (ab1+ac2)+B \times (ab1+bc3)+C(ac2+bc3))$, fruits×(all types×(apple+banana+mandarin orange)+
red×apple+yellow×(banana+mandarin oranges)),
fruits×(all types×(apple+banana+mandarin
orange)+round×(apple+mandarin orange)+elon-
gated×banana), vegetables×(all types×(Japanese radish+cucumber+
burdock)+thick×Japanese radish+thin×(cucum-
ber+burdock)), company×(employee×(employee
1+employee 2+employee 3+employee 4)+busi-
ness×(employee 1+employee 2)+accounting×
(employee 3+company 4)), In this case, the last (fifth) example is updated as follows, if, for example, a general affairs department is newly established and employee 5 is adopted and assigned to the general affairs department.

EXAMPLE company×(employee×(employee 1+employee 2+em-
ployee 3+employee 4+employee 5)+business×
(employee 1+employee 2)+accounting×(em-
ployee 3+employee 4)+general affairs
department×employee 5)

(5) Adjunction Space Information

Adjunction space information is made up by relating subsets included in respective portions to two subsets, i.e., subset X and subset Y, included in the topological space information. In the present embodiment, a relationship established consequently is referred to as an equivalent relationship.

It is assumed here that topological space information T (with a topological ID of Tid) and topological space information U (with a topological ID of Uid) are stored as topological space information Tid×(the sum of subsets belonging to T)+topological space information Uid×(the sum of subsets belonging to U). Also, the sum of subsets belonging to T can be divided into two subsets, that is subset T0+subset T−T0.

In this case, factor p of the topological space information T that associates topological space information U with topological space information T as well as factor q (that corresponds to a second equivalent factor according to the present invention) of topological space information U are specified. Then, topological space information T is separated into subset T0 that includes factor p and subset T−T0 that does not include factor p. Here, T−T0 is a relative complement obtained by removing set T0 from set T. Also, topological space information U is separated into subset U0 that includes factor q (that corresponds to a second related term according to the present invention) and subset U−U0 that does not include factor q. Here, U−U0 is a relative complement obtained by removing set U0 from set U.

The sum of the two pieces of topological space information T and U are represented as follows.

EXAMPLE

Topological space information $Tid \times$(subset $T0$)+topo-
logical space information $Tid \times$(subset $T-T0$)+
topological space information $Uid \times$(subset $U0$)+
topological space information $Uid \times$(subset
$U-U0$)

In this way, a subset that is taken out of a set and includes specific factor p is referred to as a quotient. Also, the subset excluding the quotient is referred to as a residue.

Furthermore, it is assumed here that there is a description of subset T0=T0id×(sum of terms of T0), subset U0=U0id× (sum of terms of U0). In this case, the following adjunction space information can be composed by relating subset U0 to subset T0. That is, the adjunction space information in this case is {left factor of p in subset T0+left factor of q in subset U0} {p+q} {right factor of p in subset T0+right factor of q in subset U0}+topological space information Tid×(subset T−T0)+topological space information Uid×(subset U−U0). Here, both the left factor of p in subset T0 and right factor of p in subset T0 correspond to first attached factors according to the present invention. Also, both the left factor of q in subset U0 and right factor of q in subset U0 correspond to second attached factors according to the present invention.

Note that whereas a case in which information at the topological space level is attached has been described herein, adjunction space information can also be defined with respect to information at the cellular space level composed by defining an attribute and attribute value and set-information at the set theoretical level made up of a combination of terms, in addition to information at the topological space level. Besides, adjunction space information can also be defined between information at one of the topological space, cellular space, and set theoretical space levels and information at another level.

Here, it is assumed that the sum of topological space information on fruits and topological space information on vegetables are stored as illustrated below.

EXAMPLE

Fruits×(all types×(apple+banana+mandarin orange)+
round×(apple+mandarin orange)+elongated×
banana)+vegetables×(all types×(Japanese radish+cucumber+burdock)+thick×Japanese radish+
thin×(cucumber+burdock))

Here, it is assumed that "elongated," which is a factor of topological space information on fruit, and "thin," which is a factor of a subset of topological space information on vegetables, are specified to be associated with each other and have an equivalence relation. Here, the two pieces of topological space information are each separated into a quotient and residue as follows. That is, the two pieces of topological space information, each separated into a quotient and residue are: fruit×elongated×banana+fruits×(all types×(apple+banana+mandarin orange)+round×(apple+mandarin orange))+vegetables×thin×(cucumber+burdock)+vegetables×(all types×(Japanese radish+cucumber+burdock)+thick×Japanese radish).

Then, the adjunction space information is made up of "elongated" for which an equivalence relation is specified and "thin" which is a subset of the topological space information on the vegetables as follows: {fruits+vegetables}×{elongated+thin} {banana+(cucumber+burdock) }+fruit×(all types×(apple+banana+mandarin orange)+round×(apple+mandarin orange))+vegetables×(all types×(Japanese radish+cucumber+burdock)+thick×Japanese radish).

In this way, the adjunction space information is joined together while maintaining structures of the two pieces of topological space information, based on the factors specified to be related to each other and having an equivalence relation. If an equivalence relation is recognized between "thin" and "elongated" from the adjunction space information, the right factor "banana" and "(cucumber+burdock)" can be associated with each other and outputted as {banana+(cucumber+burdock)}.

Suppose a bunch of slips and information describing MEMO are stored as follows: slip ID of first slip (A {ϵ+B+C {C1+C2}+D+E {E1+E2}} (a{ϵ+b+c {c1+c2}+d+e {e1+e2}}+position (top right+bottom right)))+slip ID of second slip (A {ϵ+B+C {C1+C2}+D+E {E1+E2}}+(a{ϵ+b+c {c1+c2}+d+e {e1+e2}}))+MEMO (1(aiu)+2 (ABC))+ . . .

Now, description will be given of an example in which MEMO is pasted to the top right of the first slip by specifying position.

In this example, to paste MEMO 1 to the top right of the first slip, first a quotient space is created in each of the factor "1" of MEMO information and the factor "top right" of information on the first slip. Slip ID of first slip (A {ϵ+B+C {C1+C2}+D+E {E1+E2}} (a{ϵ+b+c {c1+c2}+d+e {e1+e2}}+position (bottom right)))+slip ID of first slip×position (top right)+slip ID of second slip (A {ϵ+B+C {C1+C2}+D+E {E1+E2}}+(a{ϵ+b+c {c1+c2}+d+e {e1+e2}}))+MEMO (2(ABC))+MEMO (1 (aiu))+ . . .

Here, when "1" and "top right" are attached to each other by being specified to be related to each other, adjunction information is composed as {slip ID of first slip×position+MEMO} {top right+1} {ϵ+(aiu)}+information including a subset of the residue. In this way, adjunction information can join together and store two pieces of target information having nothing in common in terms of structure, with their structures prior to adjunction being maintained.

(6) Cellular Space Information

Cellular space information has attributes of things, organizations, persons, and the like or attributes of concepts handled by persons, and attribute values of the attributes. The attributes are classified into a key attribute and other attributes. The key attribute is an attribute whose information can be identified by an attribute value, and corresponds to a value that can be used as a key in a database search. In the cellular space information, the attribute value (or a string obtained by joining together plural attribute values) is referred to as an instance. The instance corresponds to a record stored in a conventional database table. Each instance has identification information called an instance ID. Also, when there are plural key attributes or plural other attributes, the key attributes or other attributes are described in the form of ordered factors, using second parenthesis "{" and "}". That is, the attributes and corresponding attribute values are described in a so-called vector format.

The cellular space information includes a cellular space ID (that corresponds to a cellular space identifier according to the present invention), a factor of the key attribute, a factor having a unit element and an attribute other than the key attribute, and a factor having an instance set. The cellular space information is made up of cellular space ID×(key attribute×{ϵ+(sum of other attributes)}×((sum of instance IDs×{ϵ+(sum of values)}))).

The factor of the key attribute as well as the factor having a unit element and an attribute other than the key attribute corresponds to a factor element according to the present invention. Also, if any attribute among {ϵ+(sum of other attributes)} is made up of the product of plural identifiers, such an attribute made up of the product of plural identifiers corresponds to a sequence of attributes according to the present invention. Also, if such an attribute is a factor enclosed in second parentheses "{ }", the attribute enclosed in second parentheses corresponds to an ordered factor of attributes according to the present invention.

Also, if the values in {ϵ+(sum of values)} of the instance are made up of products of identifiers by corresponding to such an attribute, the values correspond to a value string according to the present invention. Also, when the values are factors enclosed in second parentheses "{ }", factors enclosed in the second parentheses "{ }" correspond to the ordered factors according to the present invention.

An example of cellular space information can be illustrated as follows.

EXAMPLE

Fruit id×(name {ϵ+form+color}(apple {ϵ+round+red}+mandarin orange {ϵ+round+yellow}+banana {ϵ+elongated+yellow}))+vegetable id×(name {ϵ+shape+color}(Japanese radish {ϵ+thick+white}+cucumber {ϵ+thin+green}+burdock {ϵ+thin+brown}))

In this example, information described as a fruit table or a vegetable table in a conventional relational model is described using an expression-based representation. Note that this example includes two pieces of cellular space information (fruits and vegetables), and thus is sometimes also called integrated cellular space information.

A process example of the integrated cellular space processing information will be illustrated. To begin with, among instances of fruits, a subset (called a quotient) of instances, of which the attribute "form" has a value of "elongated," and a subset (called a residue) of other instances are created. Also, first, instances of vegetables are separated into instances (called quotients), of which the attribute "form" has a value of "thin" and other instances (called residues). In this case, joint cellular space information is as follows.

> Fruit id×banana×form×elongated+vegetable id×shape×(cucumber+burdock) thin+fruit id× (name {ϵ+form+color}(apple {ϵ+round+red}+ mandarin orange {ϵ+round+yellow}+banana {ϵ+yellow}))+vegetable id×(name {ϵ+shape+color}(Japanese radish {ϵ+thick+white}+cucumber {ϵ+green}+burdock {c+brown}))

Next, a subset of fruits, of which the attribute "form" has a value of "elongated" and a subset of vegetables, of which the attribute "shape" has a value of "thin" are specified to be related to each other and an equivalence relation is established. Adjunction space information created based on this equivalence relation is as follows.

> {fruit id×form×banana+vegetable id×shape×(cucumber+burdock)}{elongated+thin}{ϵ+e}+fruit id× (name {ϵ+form+color}(apple {ϵ+round+red}+ mandarin orange {ϵ+round+yellow}+banana {ϵ+yellow}))+vegetable id×(name {ϵ+shape+color}(Japanese radish {ϵ+thick+white}+cucumber {ϵ+green}+burdock {ϵ+brown}))

DESCRIPTION EXAMPLE

The following paragraphs illustrate how a table and tree structure, which are conventional data structures, can be described using a data structure according to the present embodiment.

Figure 2:
FIG. 2 is a diagram illustrating an example of a first data structure of cellular space information.

FIG. 2 illustrates a first exemplary data structure of cellular space information according to a first embodiment. As illustrated in FIG. 2, according to the first embodiment, target information that is conventionally expressed in a tabular form as normalized table structure can be stored in a state of presentation form 1 in the storage device. In presentation form 1, character A denotes a key attribute (such as employee number) while B, C, D, and E denote other attributes (such as full name, sex, year employed, own department).

Figure 3:
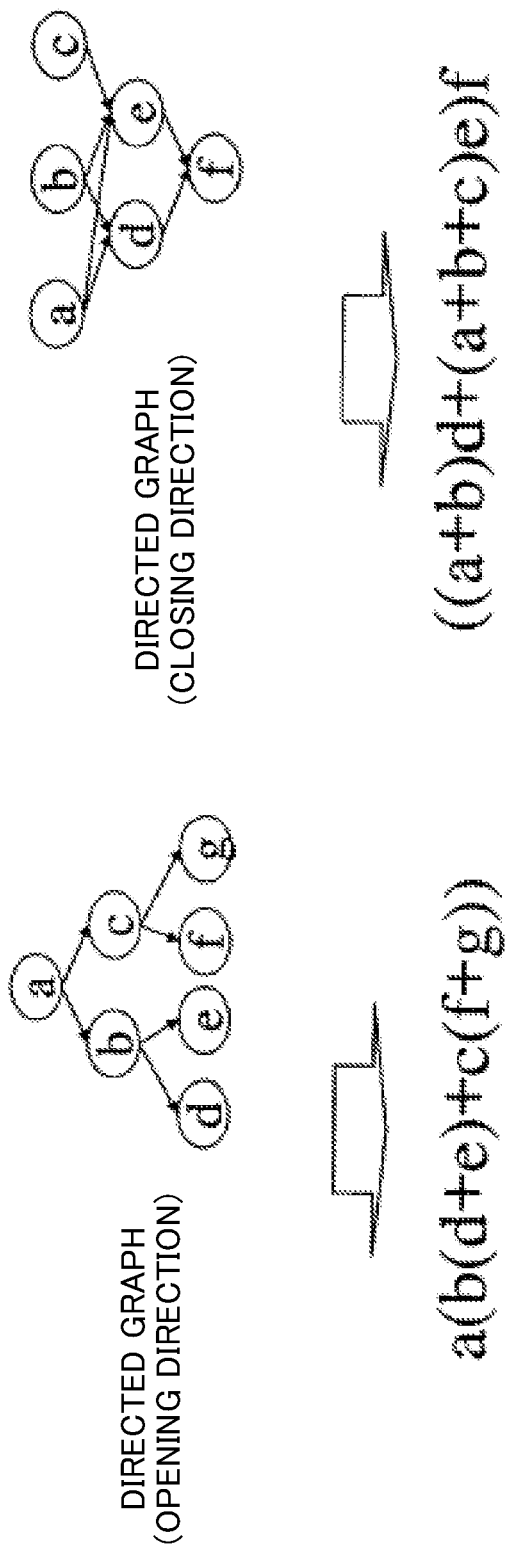
FIG. 3 is a diagram illustrating an example of a second data structure of the cellular space information.

FIG. 3 illustrates a second exemplary data structure of cellular space information according to the first embodiment. As illustrated in FIG. 3, according to the first embodiment, the target information conventionally expressed as a tree structure can be stored in presentation form 2 or 3 in the storage device. Here, as illustrated in FIG. 3, presentation forms 2 and 3 support a tree structure as part of a directed graph. In presentation form 2, character a denotes, for example, animals, b denotes mammals, c denotes fish, d denotes man, e denotes whales, f denotes tunas, and g denotes carps. In this case, b (mammals) and c (fish) inherit attributes of a (animals), such as "eat" and "breathe." Common attributes of b (mammals) and c (fish) are defined as those of a (animals).

Thus, the expression-based representation according to the present embodiment allows knowledge bases such as frames or object-oriented databases to be described and stored in the storage device. The information processing device according to the present embodiment can accept input of information about corresponding things, generate and store appropriate information in the storage device, and read out and output part or all of the information as well.

Also, target information expressed by an inverted tree structure can also be stored in presentation form 3 in the storage device. The inverted tree structure can be used in composing more complicated information from basic information. In presentation form 3, for example, character a denotes a CPU, b denotes an interface, c denotes a drive unit of an external storage, d denotes a CPU board, e denotes an external storage device, and f denotes a personal computer.

In this way, the reverse tree structure makes it possible to compose more complicated information from basic information such as a product design book or business process control chart and manage the composed information. Thus, the expression-based representation according to the present embodiment can describe product design information, business processes, and the like.

Figure 4:
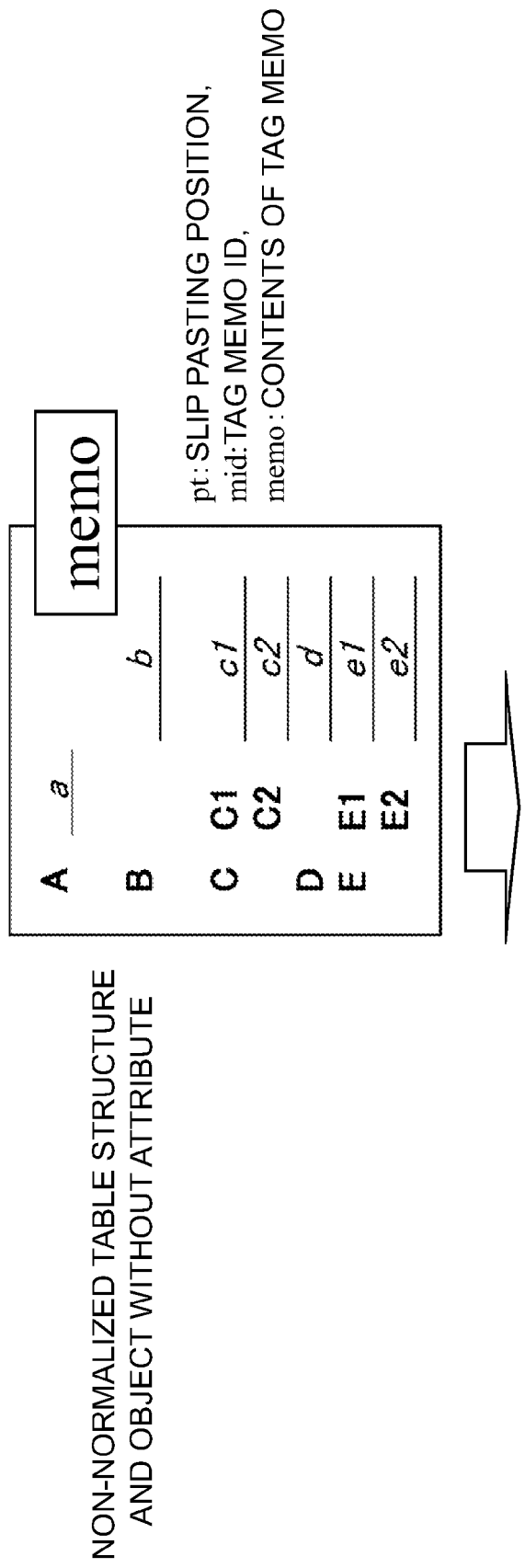
FIG. 4 is a diagram illustrating an example of a third data structure of the cellular space information.

FIG. 4 illustrates a third exemplary data structure according to the first embodiment. As illustrated in FIG. 4, a non-normalized table structure and target information without any attribute can also be maintained in a state of presentation form 4. Here, as illustrated in FIG. 4, target information representing a slip and target information corresponding to a tag memo added to the target information can be presented as an example of the non-normalized table structure and the target information without any attribute. If adjunction space is created, a process equivalent to appending contents of a tag memo to a slip can be implemented on a computer.

If slips are stored in a table by being classified by the type, the information can be managed in a conventional database using a relational model. However, if the number of slip types varies, when the existing slip configuration is changed, the relational model cannot deal with the situation.

Now, the expression-based representation will be described in more detail based on presentation form 4 described above. The ID or id (identification) identifies stored target information. The target information is made up of identifiers A to E2 and a to e2, first parentheses ( ) and second parentheses differing in associative strength during an operation, factors {C1+C2}, {E1+E2}, and the like expressed using the parentheses, terms E×{E1+E2} and the like expressed by the product of the factors, and an expression expressed by the sum of the terms. Note that in the present embodiment, the term is also referred to as an element. Also, as already described, the unit element c is a symbol processed as 1 when a predetermined process is performed. Special symbols other than those described above include the zero element Φ processed as 0 when a predetermined process is performed. Based on these assumptions, as a predetermined program is executed, the stored target information is generated according to inputted slip data, stored in the storage device, separated into subsets, bonded with other subsets or searched for.

In the example of FIG. 4, the first slip represented by slip ID1, the second slip represented by slip ID2, and a memo represented by MEMO are illustrated as instances by way of example. Also, in this case, the first slip and the second and subsequent slips may differ from each other in the configuration of terms. The present information processing device 100, which can give attributes individually to identifiers or terms making up target information, can freely store, search for, and change different identifiers or terms having different attribute lists. Also, if an attribute is added in { } using a + identifier and an attribute value corresponding to the attribute is added, the attribute and attribute value can be freely added, changed, and deleted even during operation of the database. Thus, the present embodiment makes it possible to flexibly change the structure of handled data without carrying out precise and detailed file design.

(Position Expression)

A position expression is a presentation form that includes positional information that indicates the positions of identifiers in the expression-based representation. Positional information is also referred to as absolute positional information. Examples of the expression-based representation include information described by an identifier, product operator, and sum operator, where the product operator joins plural identifiers into a string of ordered factors and the sum operator composes a combination of terms from the identifier and/or the plural identifiers joined into a string of factors. Therefore, the positions of identifiers, i.e., the position expression can be described by the positions of terms at which the respective identifiers are included in the expression-based representation and the positions of factors at which the respective identifiers are contained in the terms. Note that the position expression can also be called target information in the sense that the position expression is an object of processing according to the present embodiment. Example 1 illustrates, by example, a presentation form in which positional information indicating the position of an identifier is added to the left side of the identifier. However, the positional information may be added to the right side of the identifier.

The positional information in the position expression is defined by <position of item×position of factor>. Therefore, in the present embodiment, the position expression takes the form: <position of item×position of factor> identifier.

EXAMPLE

For example, an expression-based representation A+B+C containing identifiers A, B, and C becomes <1×1>A+<2×1>B+<3×1>C in the position expression. That is, <1×1>A indicates that the identifier corresponding to the first factor of the first term is A. Also, <2×1>B indicates that the identifier corresponding to the first factor of the second term is B.

Also, for example, an expression-based representation A+A×B+A×B×C containing identifiers A, B, and C becomes <1×1>A+<2×1>A+<2×2>B+<3×1>A+<3×2>B+<3×3>C in the position expression. Thus, in an expression-based representation that does not include the first parenthesis "(" and ")", the identifier Z, which is the j-th factor of the i-th term in the expression-based representation is described as <i×j>Z. Also, the position expression of an entire expression-based representation including plural terms is a series of the position expressions of respective identifiers delimited by a delimiter such as a plus sign (+).

Note that "<" and ">" are delimiters used for explanation, and that there is no need to use "<" and ">" on the computer. For example, the character & used for a position representation may be introduced, enabling a description such as & position of term×position of factor. Similarly, the symbol between "position" and "factor" does not have to be "×". For example, the underscore "_" may be used. Furthermore, regarding a position representation among plural terms, instead of arranging <i×j> Z using the plus sign (+) as a delimiter, the terms may be arranged by delimiting the terms with another delimiter, such as another symbol that represents a dot, comma (,), colon (:), semicolon (;), space, tab, or the like.

In the expression-based representation containing first parentheses "(" and ")", information is described hierarchically using identifiers. Therefore, information indicating the depth of the hierarchy and the position at which the hierarchy deepens (a first parenthesis appears) is introduced into a position representation corresponding to the expression-based representation containing first parentheses "(" and ")".

The expression-based representation A×(B+C×(D+E))+F×(G+H) is converted into a position expression as follows.

EXAMPLE

<1×1>A+(1×2)<1×1>B+(1×2)<2×1>C+(1×2)(2×2)
<1×1>D+(1×2)(2×2)<2×1>E+<2×1>F+(2×2)
<1×1>G+(2×2)<2×1>H

In the expression-based representation of the above example, identifier B is in the second factor of the first term. Also, the second factor is enclosed in first parentheses "(" and ")". Thus, first the position expression of identifier B includes (1×2). Then, identifier B is the first factor of the first term in ( ) of the second factor. Thus, the position expression of identifier B becomes (1×2)<1×1>B.

Similarly, in the expression-based representation of the above example, identifier C is the first factor of the second term in the second factor in the first term. Thus the position expression of identifier C becomes (1×2)<2×1>C. Furthermore, in the expression-based representation of the above example, identifier D is in the second factor of the second term in the second factor in the first term. Thus, first, (1×2)(2×2) is indicated explicitly as positional information on identifier D. Furthermore, in the second factor of the second term in the second factor in the first term, identifier D is the first factor of the first term in ( ). Thus, eventually the position expression of identifier D is (1×2) (2×2)<1×1>D.

As illustrated in the above example, when identifier Z is located in a factor enclosed in ( ), (i×j) is used as information indicating the position of the term containing identifier Z and the position of the factor in the term, where (i×j) indicate factors (assembly factor) that are located in the j-th factor in the i-th term and whose j-th factor is enclosed in first parentheses. The position expression of the expression-based representation such as in the above example is described by a combination of information expressed by (i×j), indicating the existence of first parentheses and information indicating the position of a term, such as <k×l>, that does not include a factor of the ( ) type and the position of a factor. Therefore, when a factor deepens two or more hierarchical levels via plural pairs of ( ), information, such as (i1×j1) (i2×j2), indicating the existence of first parentheses is listed. The depth of the hierarchy created using first parenthesis is indicated explicitly by the number of listed pieces of information indicating the existence of first parentheses.

An example in which a relationship between the position expressions obtained from an expression-based representation and identifiers is stored in a database table is illustrated in FIG. 5. However, in FIG. 5, the position expressions are represented by absolute positional information. FIG. 5 describes the relationship between the position expressions obtained from the expression-based representation of the above example and the identifiers in the table. As illustrated in this example, according to the first embodiment, the relationship between the position expressions and identifiers can be stored in a tabular form, such as: the first factor of the first term is A, the first term in the second factor of the first term is B, the first factor of the second term in the second factor of the first term is C, and the first term in the second factor in the second factor of the first term is D.

Furthermore, for example, when C is found as a value, if <2×1> is excluded from the position expression (1×2)<2×1> of C and the position expression (1×2) is searched for, an identifier related to identifier C can be acquired. For example, if a value corresponding to an attribute including a position expression (1×2) (i×j) is acquired, the term including factor C can be acquired. Here, i and j are any integers. It is assumed that in Example 1, the position expression (1×2) (i×j) is described as (1×2)*.

That is, by converting an expression-based representation into position expressions and associating each identifier with a position expression as illustrated in FIG. 5, it is possible to convert the expression-based representation into data of an existing database. This allows the expression-based representation to be processed using a function such as a management system of an existing database.

Even when an expression-based representation includes second parentheses "{" and "}", a corresponding position representation can be generated as with an expression-based representation including first parentheses "(" and ")". For example, an expression-based representation A×(B+C×{D+E})+F×{G+H} is converted into a position expression as follows.

$$<1\times1>A+(1\times2)<1\times1>B+(1\times2)<2\times1>C+(1\times2)\{2\times2\}<1\times1>D+(1\times2)\{2\times2\}<2\times1>E+<2\times1>F+\{2\times2\}<1\times1>G+\{2\times2\}<2\times1>H$$

In this way, if positional information is created by combining first parentheses and second parentheses, even when factors of a term include a hierarchical expression-based representation due to the combination of first parentheses and second parentheses, the positions of identifiers in the expression-based representation can be described uniquely.

It can be said that each section of the absolute positional information demarcated by parentheses is a connection of the following occurrence sequences via a product operator using infix notation: the occurrence sequence of the term that includes the identifier, in the expression and the occurrence sequence of the factor that includes the identifier, in the term that includes the identifier. For example, in the second row of FIG. 5, the absolute positional information <1×1> correlated with the value "A" indicates the first factor A in the first term A×(B+C×{D+E}) of the expression A×(B+C×{D+E})+F×{G+H}.

Also, multiplication among the plural pairs of parentheses in the absolute positional information represents a nested hierarchical structure in the expression-based representation. For example, in the third row of FIG. 5, the first pair of parentheses (1×2) in the absolute positional information correlated with the value "B" indicates the second factor (B+C×{D+E}) of the first term A×(B+C×{D+E}) in the expression A×(B+C×{D+E})+F×{G+H}. Also, the second pair of parentheses <1×1> indicates the first factor B of the first term B in the expression (B+C×{D+E}). Note that in the present embodiment, it is assumed that the larger the number of enclosing parentheses, the lower the hierarchical level or the deeper the hierarchy.

Also, of the parentheses in the absolute positional information, the first parentheses "(" and ")" indicate the hierarchical level demarcated by the first parentheses in the expression-based representation. On the other hand, the second parentheses "{" and "}" indicate the hierarchical level demarcated by the second parentheses in the expression-based representation.

Thus, the position expression allows the information described by the expression-based representation to be expressed in a form in which information that enables uniformly identifying the position of each identifier is added. Also, the expression and position expression in the expression-based representation are mutually convertible.

Note that positional information may be added to an expression included in the expression-based representation. For example, positional information is added to at least any of the factors included in each of all the terms (a subset of the expression-based representation) included in the expression-based representation. The expression-based representation A×(B+C×(D+E))+F×(G+H) includes two terms A×(B+C×(D+E)) and F×(G+H). In so doing, if positional information is added to the first factors A and F of respective terms, the initial expression-based representation can be represented by a position expression <1×1>A×(B+C×(D+E))+<2×1>F×(G+H). Then, the original expression-based representation can be divided into two parts <1×1>A×(B+C×(D+E)) and <2×1>F×(G+H) or can be returned to the original position expression by joining together the parts resulting from the division based on the positional information.

Also, as indicated by the associative law described above, part of an expression-based representation joined by the sum operator can be divided into subsets (portions of the expression-based representation demarcated by round brackets) at any position. For example, an expression A+B+C can be expressed as A+(B+C) or (A+B)+C. In this way, if the expression-based representation is divided into subsets of terms and positional information is added to each term, the original expression-based representation can be restored by joining together the terms based on the positional information. Thus, the expression-based representation described above can be expressed by a position expression <1×1>A+<2×1>B+<3×1>C as well as by a position expression <1×1>A+<2×1>(B+C) or <1×1>(A+B)+<2×1>C.

(System Configuration)

Figure 6:
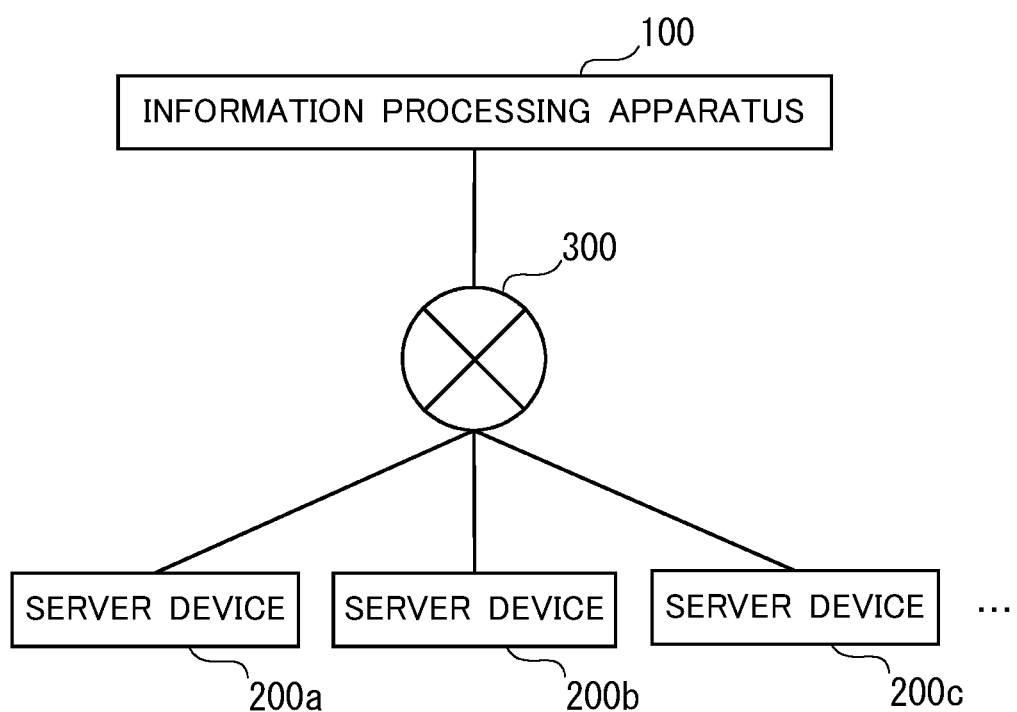
FIG. 6 is a block diagram illustrating by example a configuration of an information processing system according to an embodiment.

FIG. 6 is a configuration diagram illustrating an example of a system according to the present embodiment. The system 1 in FIG. 6 includes an information processing device 100 that controls processes according to the present embodiment and server devices 200 (200*a*, 200*b*, 200*c* . . . in the example of FIG. 6) that perform the processes according to the present embodiment in a distributed manner. Also, the information processing device 100 and server devices 200 are connected with each other via a network 300 in such a way as to be able to communicate with each other. Note that although description is given in the example of FIG. 6 by assuming that one information processing device 100 centrally controls other server devices 200 an apparatus group may be organized so as to perform distributed control. That is, whichever apparatus may accept a processing request, the apparatus stores data in other apparatus and the own apparatus in a distributed manner by dividing the data or join the data held by itself to the data held by the other apparatus (this process of also referred to as "restoration") and outputs a result of joining.

(Equipment Configuration of Information Processing Device)

Figure 7:
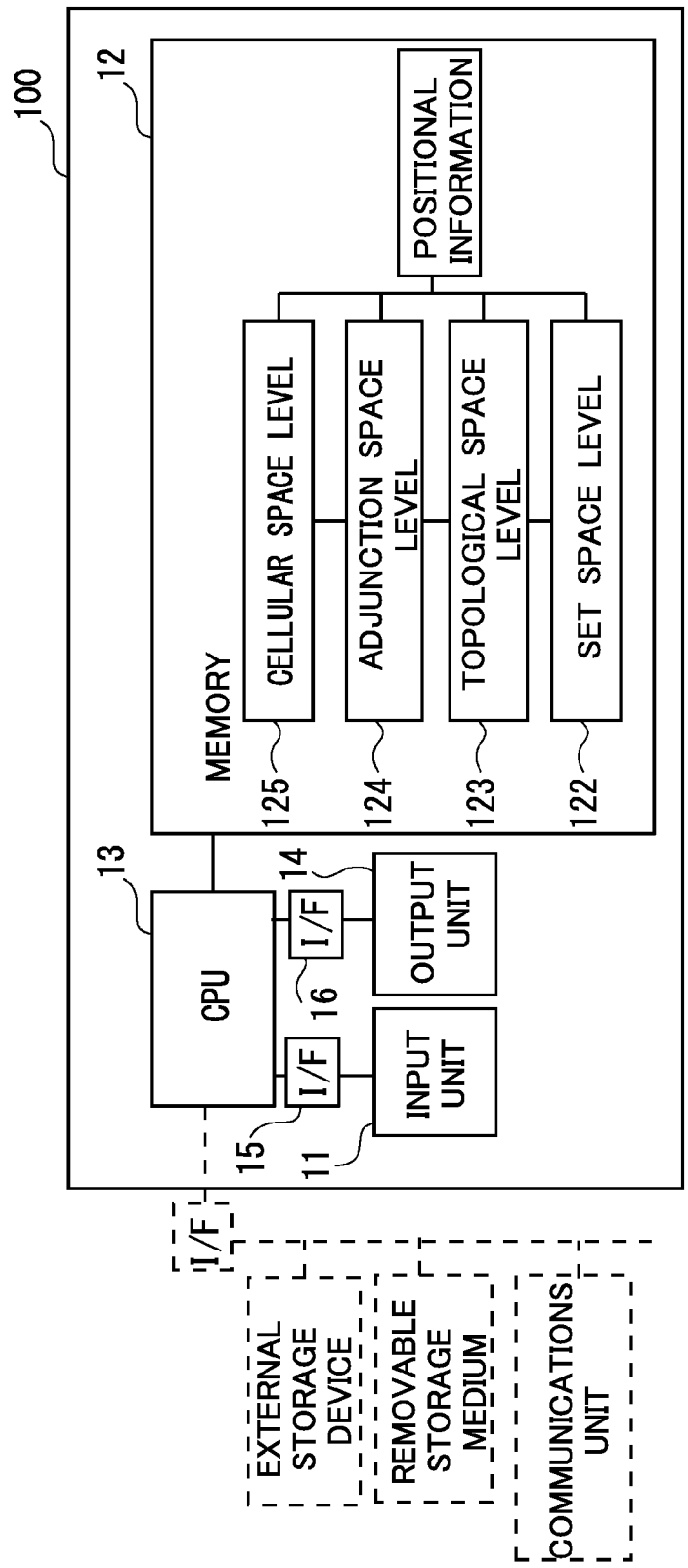
FIG. 7 is a block diagram illustrating by example a configuration of an information processing device according to the embodiment.

FIG. 7 is a block diagram illustrating by example a configuration of the information processing device 100 according to the first embodiment (also referred to as Example 1). As illustrated in FIG. 7, the information processing device 100 according to the first embodiment includes input means 11 such as a keyboard and pointing device used to enter target information, a memory 12 (that corresponds to a storage unit according to the present invention) that stores the entered target information, a CPU 13 that processes the target information based on a predetermined program, output means 14 such as a display that outputs the entered target information or processed target information, an interface 15 that connects between the CPU 13 and input means 11, and an interface 16 that connects between the CPU 13 and output means 14.

The interface 15 is, for example, a serial interface such as USB (Universal Serial Bus). Also, the interface 16 is, for example, an output interface for an RGB (red, green, blue) image signal and a synchronizing clock.

However, as indicated by dotted lines in FIG. 7 by example, the information processing device 100 may be connected with an external storage device, a drive for a removable storage medium, a communications unit, and the like via an interface. Here, examples of the external storage device include a hard disk drive and an SSD (Solid State Drive). Also, examples of the removable storage medium include a CD (Compact Disc), a DVD (Digital Versatile Disk), a blue-ray disk, and a Flash memory card. Also, the communications unit is a device such as an NIC (Network Interface Card) that accesses a network and communicates with other information processing device.

Typically, the information processing device 100 is a computer such as a personal computer or server. However, the information processing device 100 is not limited to such computers, and can be implemented, for example, as a personal digital assistant, a cell phone, a PHS (Personal Handyphone System), a digital television set, a tuner or set top box of a digital television set, a television recording device containing a hard disk, an in-vehicle terminal, or the like. Also, the memory 12 can be a volatile DRAM (Dynamic Random Access Memory), a nonvolatile EPROM (Erasable Programmable Read Only Memory), an EEPROM (Electronically Erasable and Programmable Read Only Memory), a flash memory, or the like.

Functions of the information processing device 100 are implemented when the CPU 13 executes a program. The program is installed in the memory 12 or a non-illustrated external storage device. The program is installed from a network via a communications interface or from a removable storage medium. Thus, the program, is distributed via a network or removable storage medium.

Also, the target information stored in the memory 12 or a non-illustrated external storage device moves among different levels when the CPU 13 executes a predetermined program. Note that different levels mean, for example, a set theoretical level 122 at which the abstraction level of the target information is expressed as being the highest, a topological space level 123 at which the abstraction level of the target information is lower than at the set theoretical level 122 and the target information is expressed by using subsets as elements, an adjunction space level 124 at which the abstraction level of the target information is lower than at the topological space level and pieces of the target information at the topological space level are attached to each other and a cellular space level 125 at which the target information in the topological space is expressed as having a predetermined attribute. Also, the target information expressed at each level can be represented as a position expression with positional information added thereto.

(Equipment Configuration of Server Device)

Figure 8:
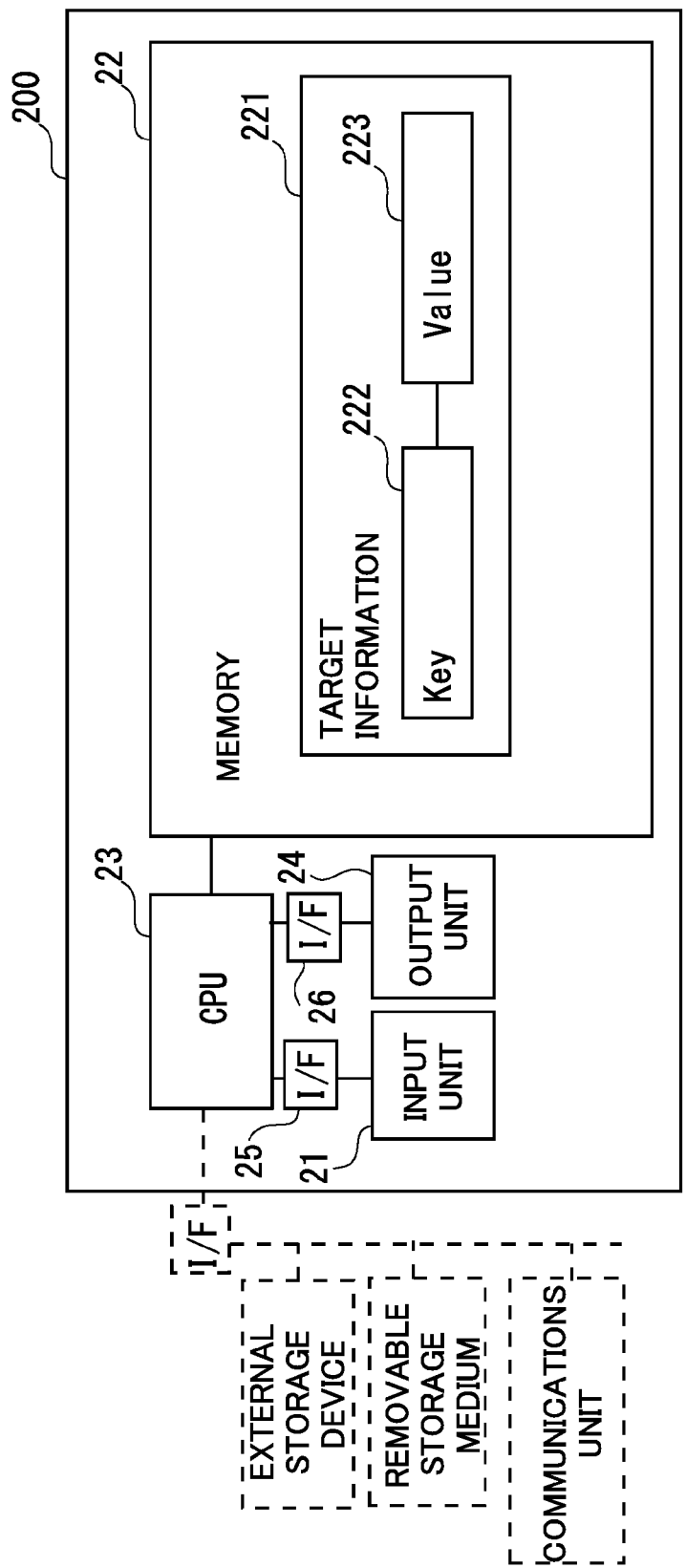
FIG. 8 is a block diagram illustrating by example a configuration of a server device according to the embodiment.

FIG. 8 is a block diagram illustrating by example a configuration of the server device 200 according to the first embodiment. As with the information processing device 100, the server device 200 is a common computer device. As illustrated in FIG. 8, the server device 200 according to the first embodiment includes input means 21 such as a keyboard and pointing device used to enter target information, a memory 22 (that corresponds to a storage unit according to the present invention) that stores the entered target information, a CPU 23 that processes the target information based on a predetermined program, output means 24 such as a display that outputs the entered target information or processed target information, an interface 25 that connects between the CPU 23 and input means 21, and an interface 26 that connects between the CPU 23 and output means 24.

The interface 25 is for example, a serial interface such as USB. Also, the interface 26 is, for example, an output interface for an RGB image signal and a synchronizing clock.

However, as indicated by dotted lines in FIG. 8 by example, the server device 200 may be connected with an external storage device, a drive for a removable storage medium, a communications unit, and the like via an interface. Here, examples of the external storage device include a hard disk drive and an SSD. Also, examples of the removable storage medium include a CD, a DVD, a blue-ray disk, and a Flash memory card. Also, the communications unit is a device such as an NIC that accesses a network and communicates with other information processing device.

Note that the server device 200 is not limited to such computers either, and can be implemented, for example, as a personal digital assistant, a cell phone, a PHS, a digital television set, a tuner or set top box of a digital television set, a television recording device containing a hard disk, an in-vehicle terminal, or the like. Also, the memory 22 can be a volatile DRAM, a nonvolatile EPROM, an EEPROM, a flash memory, or the like.

Functions of the server device 200 are implemented when the CPU 23 executes a program. The program is installed in the memory 22 or a non-illustrated external storage device. The program is installed from a network via a communications interface or from a removable storage medium. Thus, the program, is distributed via a network or removable storage medium.

Also, the target information (expression) 221 stored in the memory 22 or a non-illustrated external storage device with positional information added thereto is held in KVS (Key Value Store) format, in which keys 222 and values 223 are associated with each other. Note that KVS is an example of concrete implementation means, and another format may be used. For example, the positional information may be held in the key and a factor may be held in the value. Alternatively, a common factor may be held in the key and another factor joined to the common factor by a product operator may be held in the value by being connected to the value by a sum operator.

(Split Storage Process)

Figure 9:
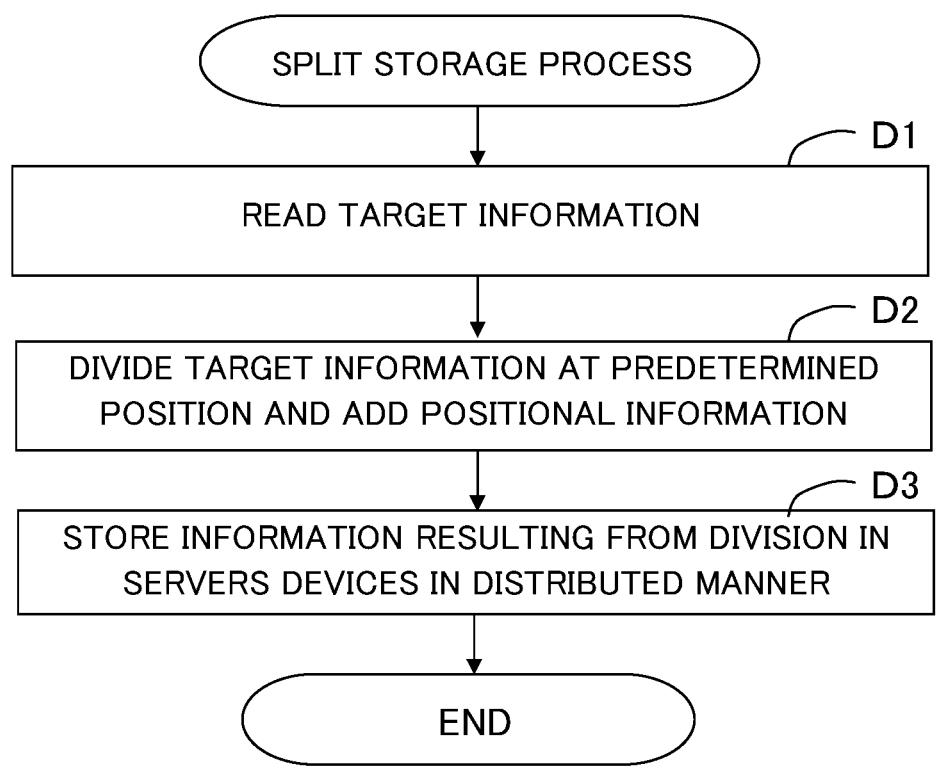
FIG. 9 is a process flowchart illustrating an example of a split storage process.

FIG. 9 is a process flowchart illustrating an example of a split storage process performed by the information processing device 100 with respect to target information. The information processing device 100 executes a computer program loaded into the memory 12 in an executable manner and thereby performs a process of FIG. 9. Note that in the process of FIG. 9, it is assumed that the target information is held in expression-based representation format.

First, the information processing device 100 reads expressions, which are target information, into the memory 12 (FIG. 9: D1). It is assumed here that some kind of target information differing in data structure (expression structure) from country to country is handled. For example, the following expressions are read.

EXAMPLE

Germany (expression 1)+France (expression 2)+Japan (expression 3)+Germany (expression 4)+France (expression 5)+Japan (expression 6)+Germany (expression 7)+France (expression 8)+Japan (expression 9)+ . . .

Note that expression 1, expression 2, . . . are expression-based representations according to the present embodiment. That is, the expressions can include the sum operator, product operator, ordered factor constructor operator, assembly factor constructor operator, and the like. Also, it is assumed that the structure of each expression varies with the name of the country connected by the product operator.

Next, the information processing device 100 divides the target information at a predetermined position and adds positional information (D2). The target information, which is a character string, can be divided at any position, but is divided at a position between terms in the expression-based representation, in the present embodiment. The position between terms corresponds to the position of the sum operator connecting the terms in the expression-based representation. Also, the expression-based representation, which includes plural nested expressions, is assumed to be divided at a hierarchical level (outside an expression demarcated by the parentheses) higher than the hierarchical level demarcated by the second parentheses (ordered factor constructor operators) according to the present embodiment. In other words, no division is done in the second parentheses. There is a danger that consistency will not be maintained if the terms included in the hierarchical level demarcated by the second parentheses are not handled by preserving ordering, but if division is done by preserving ordering, parallel processing will be enabled using the expressions resulting from the division. Description will be given of a case in which, for example, the following expression is divided.

EXAMPLE $$A(B+C)+\{D+E\}\{F+G\}$$

In this example, the expression can be divided at a position between A (B+C) and {D+E} {F+G}. Note that based on the distributive law described above, the expression may be divided into A×B and A×C+{D+E} {F+G}. However, it is assumed that division is not done between D and E or between F and G, enclosed in second parentheses. Then a search process or summarization process can be performed in parallel on the expressions resulting from the division and results can be further joined together or summarized. That is, the target information described by the expression-based representation can be held in a distributed manner and divided and thereby converted into a format that enables parallel processing.

A concrete dividing position may be specified by the user. In this case, based, for example, on the above conditions, the user specifies any of connecting points corresponding to "+" in the expression-based representation. Then, the target information is divided into plural expressions (i.e., subsets of the target information) at the specified point. For example, when the user specifies the point between the term "France" (expression 2) and term "Japan" (expression 3), the target information is divided in two subsets represented by the following position expressions.

DIVISION EXAMPLE 1

<1×1>(Germany (expression 1)+France (expression 2)),

<2×1>(Japan (expression 3)+Germany (expression 4)+France (expression 5)+Japan (expression 6)+Germany (expression 7)+France (expression 8)+Japan (expression 9)+ . . . )

Also, the dividing position may be determined based on data size such that the subsets resulting from the division will be within a predetermined size. In this case, an amount of data is calculated, for example, beginning with the top of data and the target information is divided at a position between terms existing just before a predetermined threshold is exceeded. This makes it possible to divide the target information such that the sizes of the expressions resulting from the division will be equal to or smaller than a fixed value. For example, if a predetermined size is exceeded between the top and the middle of expression 5 and the predetermined size is exceeded between the end of expression 4 and the middle of expression 9, the target information is divided into three or more subsets as follows.

DIVISION EXAMPLE 2

<1×1>(Germany (expression 1)+France (expression 2)+Japan (expression 3)+Germany (expression 4)), <2×1>(France (expression 5)+Japan (expression 6)+Germany (expression 7)+France (expression 8)), <3×1>(Japan (expression 9)+ . . . )

Also, the target information may be divided into subsets of terms such that the terms in each subset will have in common a predetermined factor connected by the product operator. This makes it possible to divide the target information according to meanings and features of information. Referring to the above-mentioned example of the expression-based representation, factors such as "Germany," "France," and "Japan," which are country names, are joined to other factors by the product operator in respective terms. Thus, if terms having in common, for example, a factor connected to the left by the product operator in each term are grouped into a subset, the target information is divided into three subsets as follows.

DIVISION EXAMPLE 3

Germany (<1×2>(expression 1)+<4×2>(expression 4)+<7×2>(expression 7)+ . . . ),

France (<2×2>(expression 2)+<5×2>(expression 5)+<8×2>(expression 8)+ . . . ),

Japan (<3×2>(expression 3)+<6×2>(expression 6)+<9×2>(expression 9)+ . . . )

Subsequently, the information processing device 100 stores the subsets of the target information resulting from the division in the servers devices 200 in a distributed manner (D3). In this step, data is divided among plural server devices 200 based on a predetermined rule, and transmitted via a network. On the other hand, upon acquiring the data, the server devices 200 store the data in the respective storage devices. In division example 1 described above, two server devices 200 hold data in KVS format as illustrated in FIGS. 10A and 10B respectively. In the example of FIGS. 10A and 10B each term resulting from the division is stored, with the key and value being correlated with the positional information and expression, respectively. Also, in division example 2, three server devices 200 hold data in KVS format as illustrated in FIGS. 11A to 11C, respectively. Again, in the example of FIGS. 11A to 11C, each term resulting from the division is stored, with the key and value being correlated with the positional information and expression, respectively. Also, in division example 3, three server devices 200 hold data in KVS format as illustrated in FIGS. 12A to 12C, respectively. In the example of FIGS. 12A to 12C, each term resulting from the division is stored, with the key being correlated with a common factor while the value being correlated with a position expression joined to the common factor by the product operator.

The dividing process described above allows target information described using an expression to be arranged in a distributed manner over plural server devices 200. Also, as with division examples 1 to 3 described above, if positional information is added to at least one factor included in each of the terms resulting from the division, the original expression can be restored by joining together the terms based on the positional information. In so doing, the expression-based representation can be processed even if expressions differing from each other in structure are included in the terms. As illustrated in FIGS. 10A to 12C, the division is done at the position of any of the sum operators connecting the terms outside the expression enclosed in ordered factor constructor operators. That is, contents of target information, such as expression 1, expression 2, expression 3, . . . is divided by following the component (identifier) order to be preserved. Thus, parallel processing can be performed on the data resulting from the division. Note that same information may be held by plural server devices 200 redundantly to improve availability.

(Joining Process)

Next, a process of joining together (restoring) target information arranged in a distributed manner and presenting the restored target information to the user. The subsets of target information generated by the dividing process described above can be returned to the original target information based on positional information. Specifically, based on positional information added to any of the factors in each term, the terms are joined together in ascending order of the value that represents the occurrence sequence of the terms and in ascending order of the occurrence sequence of factors.

Figure 13:
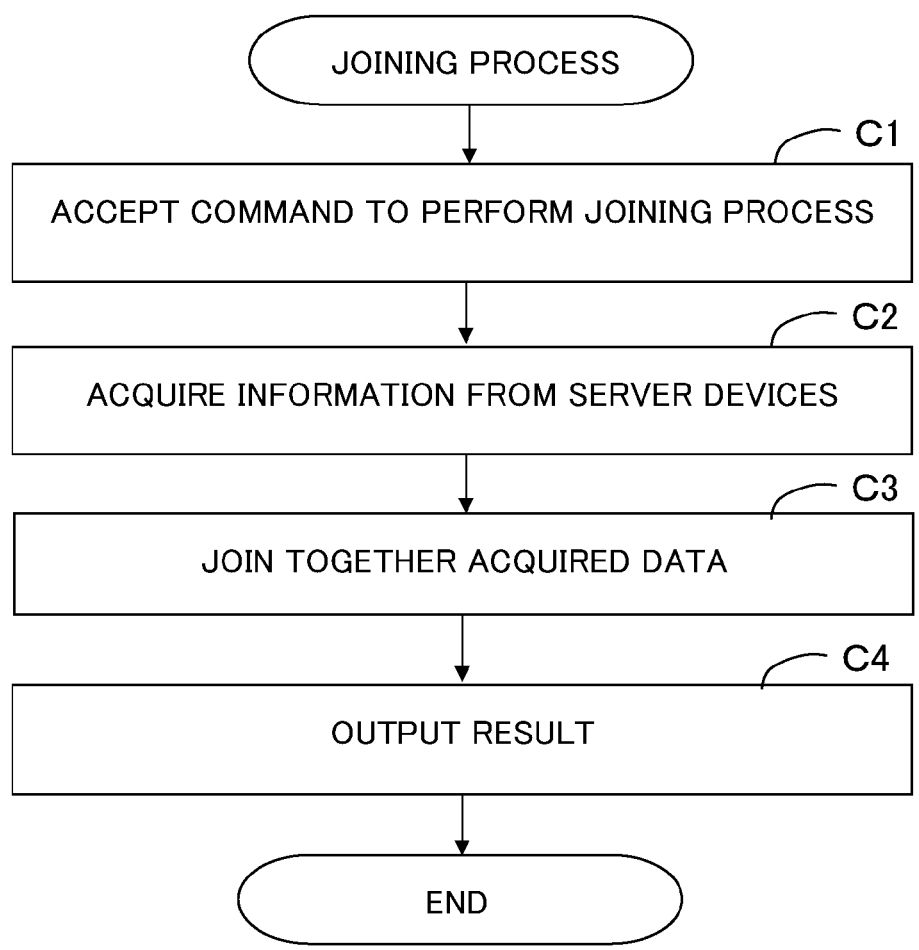
FIG. 13 is a process flowchart illustrating an example of a joining process.

An example of processing performed by an application program that performs a joining process is illustrated in FIG. 13. Note that it is assumed that position expressions generated by the dividing process are held in KVS format by the plural server devices 200 as illustrated in FIGS. 10A and 10B, FIGS. 11A to 11C, or FIGS. 12A to 12C.

First the information processing device 100 accepts a command to perform a joining process from the user (FIG. 13: C1). Also, the information processing device 100 acquires the subsets of target information stored in plural server devices 200 in a distributed manner from the respective server devices 200 (C2).

Subsequently, the information processing device 100 joins together the acquired results (C3). Since positional information has been added to the information acquired from the server devices 200, by joining together the acquired results in ascending order of the value that represents the occurrence sequence of the terms and in ascending order of the occurrence sequence of factors based on the positional information, it possible to generate the original target information. According to the present embodiment, the information processing device 100 can simply join together the processing results of the server devices 200, and so overall processing speed can be improved by increasing the number of server devices.

Subsequently, the information processing device 100 outputs a result of joining (C4). Here, the information processing device 100 may output, for example, target information described as a position expression including positional information or output target information described in an expression-based representation by deleting positional information. This concludes the joining process.

(Examples of Application to Concrete Data)

The dividing process according to the present embodiment can handle various data as target information. For example, facilities provided in an architectural structure like a building or BOMs (Bills of Materials) of industrial products and the like can be handled by converting them into expression-based representations. Generally, BOMs are described in a form varying from manufacturer to manufacturer. A building or industrial product, which is a finished product, includes plural components. Data whose schema is not standardized can be joined together as it is or can be divided into data on buildings, construction companies, or equipment manufacturers based on, for example, factors that represent buildings, construction companies, or equipment manufacturers. Also, parallel processing may be performed on the data resulting from the division. Processing performance can be improved by distributed processing.

Similarly, target information may be crude ingredients of processed food. Food varies in items of transaction data among stages from manufacture to retail. Also, distribution flow may change, including a change of a wholesaler and addition of a quality inspection step. The processes according to the above embodiment allow data whose schema is not standardized to be handled integrally. Also, the distributed processing described above can improve processing performance.

Also, target information may be a lot number of a real estate. Land may undergo changes in the lot number or place name due to partitioning (lot subdivision) or integration (lot consolidation) as a result of rezoning. Such data can be treated as a directed graph (DAG: Directed Acyclic Graph) without a loop by using, for example, a pointer. If pointer attributes are provided, use of the expression-based representation and position expression makes it possible to build a system that can refer to a land category of a certain lot by going back to the past even if the lot number changes.

Besides, associations between pieces of information that are conventionally difficult for a system to establish can be processed, including personal connections (personal relationships among personnel), associations between client requirements and definitions of requirements in software development, and atomic connections in chemical formulae in the chemical area, and processing performance can be improved as well. Note that the process of converting data into an expression-based representation and position expression can be defined for each item of data.

(Other Variations)

Figure 14:
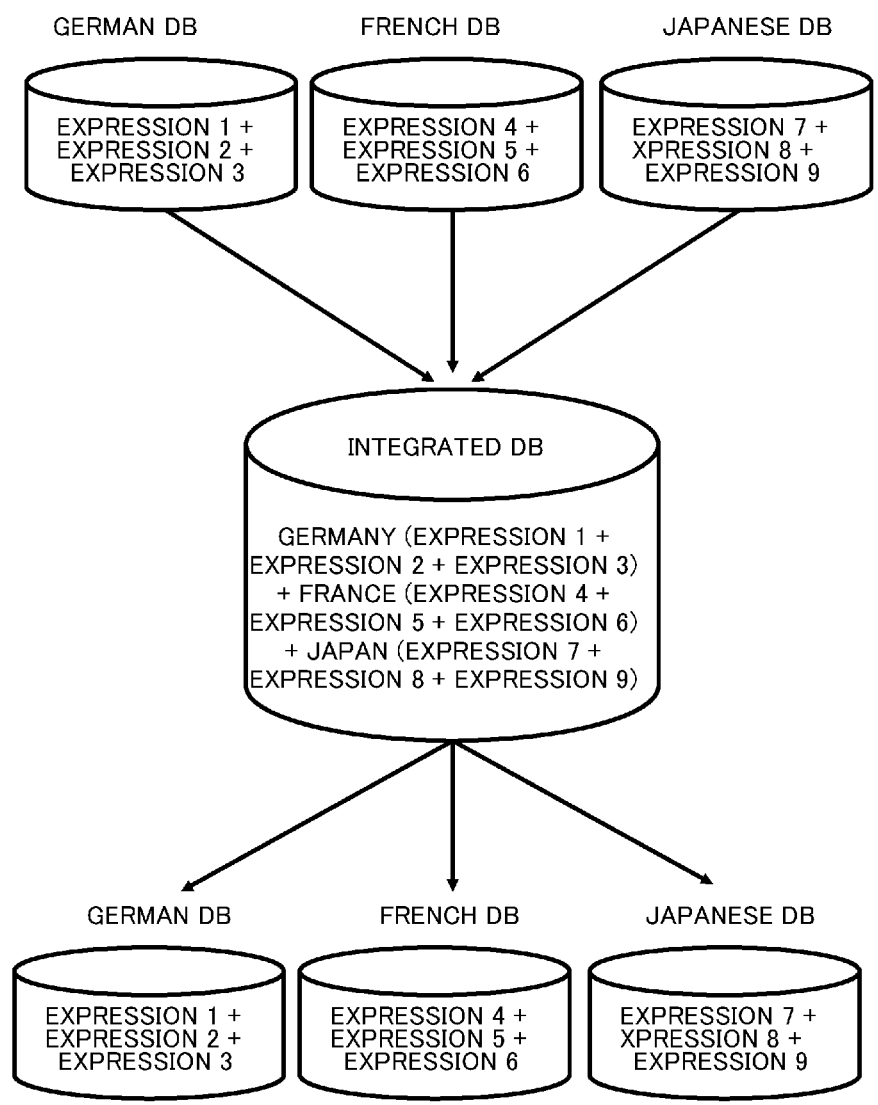
FIG. 14 is a diagram for describing integration and restoration of multiple pieces of target information.

Whereas the process of dividing a single piece of target information and the process of restoring (joining) the target information have been described in the above examples, the process of integrating plural pieces of target information and the process of restoring (dividing) the target information can also be performed. FIG. 14 is a diagram for describing integration and restoration (division) of multiple pieces of target information. As illustrated in the upper part, expressions 1 to 3, expressions 4 to 6, and expressions 7 to 9 have been registered, respectively, in a German DB (Database), French DB and Japanese DB. Here, for example, target information having data structures such as illustrated in FIGS. 2 to 4 has been described by expressions and registered in each DB. Also, the DBs are stored, for example, in three non-illustrated server devices, respectively. Note that the DBs may vary in schema from country to country.

Next, in the middle part of FIG. 14, three pieces of target information are integrated. Here, factors that represent country names and factors that describe expressions registered in the DBs of the respective countries are connected by product operators, forming respective terms and an expression formed by connecting the terms of the three DBs by sum operators is registered in an integrated DB. The integrated expression may be held in KVS format using factors representing country names as keys using expressions connected with the country names by product operators as values, and furthermore, for example, positional information in the original DB may be added to each expression. Thus, it can be said that the factors representing country names are information used to identify DBs existing prior to the integration.

Next, in the lower part of FIG. 14, three pieces of target information are restored (divided). The division is done based on, for example, the leftmost factor connected by a product operator in each term or a factor made up of one identifier connected by a product operator in each term. Then, the target information is divided and registered in the DBs (DBs of the different countries) indicated by the respective factors. Incidentally, the expression is described by one line of text, and so the original target information is restored after the division, but if positional information is added, the target information may be divided based on the positional information. The above processes make it possible to integrate the target information managed on plural server devices and perform various processes on the integrated data as well as to restore the original target information. Note that the schema does not have to be integrated among plural pieces of target information.

Also, the symbols indicating expression-based representations or position expressions described in the embodiment are only exemplary. Therefore, other symbols may be used, for example, instead of the sum operator, product operator, assembly factor constructor operators, and ordered factor constructor operators. Also, other symbols may be used instead of the position representation <i×j> (i×j) {i×j}.

Also, the scope of the expression-based representation and position expression described in the embodiment is not limited to KVS. However, a system suitable for distributed processing can be built when positional information and identifiers are held in KVS format.

Also, applications are not limited to the process of acquiring a related information law related to identifiers included in an expression-based representation. The functions of the information processing device 100 and server device 200 illustrated in the embodiment exemplify a new database data structure and a data processing procedure that have not been proposed. Thus, the technique of the embodiment can be used on a computer to process the information about things, organizations, persons, and the like handled by the user or the concepts handled by the user. Such processes on a computer can be applied generally to techniques, for example, for describing information about things, organizations, persons, and the like or concepts as information on the computer, storing the information on a main storage device such as a memory or an external storage device such as a hard disk, building a database, and extracting, updating, and managing the stored information. That is, the information processing device 100 and server device 200 according to the embodiment exemplify a new technique for representing information on the computer.

DESCRIPTION OF THE REFERENCE NUMERALS AND SYMBOLS 11, 21 Input unit
12, 22 Memory
13, 23 CPU
14, 24 Output unit
15, 16, 25, 26 Interface
100 Information processing device
200 Server device

The invention claimed is:

1. An information processing device that stores and processes target information within a computer data structure, by one or more processors communicatively connected to one or more program memories, wherein the target information is described within the computer data structure using identifiers formed from a symbol, a product operator that joins together factors containing one or more of the identifiers and thereby forms a string of ordered factors, and a sum operator that joins together terms containing one or more of the factors and thereby forms an expression that is a combination of the terms, the information processing device comprising:
  a dividing unit implemented by the one or more processors that divides the target information into a plurality of terms at a predetermined position; and
  a transmission unit implemented by the one or more processors that adds positional information to at least any of the factors contained in the terms resulting from the division and causes each of the terms resulting from the division to be held in any of a plurality of server devices, where the positional information contains an occurrence sequence of the terms in the target information and an occurrence sequence of the factors in the terms.

2. The information processing device according to claim 1, wherein the target information has a hierarchical structure that includes the expression as the factors in a nested manner, the expression being demarcated by ordered factor constructor operators that relate combinations of the terms to one another by preserving ordering or assembly factor constructor operators that relate combinations of the terms to one another without preserving ordering; and
  the predetermined position is any of portions demarcated by the sum operator outside the expression demarcated by the ordered factor constructor operators.

3. The information processing device according to claim 1, further comprising a joining unit implemented by the one or more processors that receives the terms resulting from the division from the plurality of server devices, respectively, joins together the terms in ascending order of the occurrence sequence of the terms and in ascending order of the occurrence sequence of the factors based on the positional information, and thereby generates the target information.

4. The information processing device according to claim 1, wherein the position expression held by each of the server devices is divided at a position specified by a user.

5. The information processing device according to claim 1, wherein the position expression held by each of the server devices is divided at such a position that subsets resulting from the division are within a predetermined size.

6. The information processing device according to claim 1, wherein the position expression held by each of the server devices is divided into subsets of terms, the terms in each of the subsets having in common a predetermined factor connected by the product operator.

7. An information processing method performed by an information processing device that stores and processes target information within a computer data structure, by one or more processors communicatively connected to one or more program memories, wherein the target information is described within the computer data structure using identifiers formed from a symbol, a product operator that joins together factors containing one or more of the identifiers and thereby forms a string of ordered factors, and a sum operator that joins together terms containing one or more of the factors and thereby forms an expression that is a combination of the terms, the information processing method comprising the steps of:

dividing, by the one or more processors, the target information into a plurality of terms at a predetermined position; and adding, by the one or more processors, positional information to at least any of the factors contained in the terms resulting from the division and causing each of the terms resulting from the division to be held in any of a plurality of server devices, where the positional information contains an occurrence sequence of the terms in the target information and an occurrence sequence of the factors in the terms.

8. A non-transitory computer readable medium storing a program executed by one or more processors of an information processing device that processes target information within a computer data structure, wherein the target information is described within the computer data structure using identifiers formed from a symbol, a product operator that joins together factors containing one or more of the identifiers and thereby forms a string of ordered factors, and a sum operator that joins together terms containing one or more of the factors and thereby forms an expression that is a combination of the terms, the program comprising instructions that, when executed by the one or more processors, cause the information processing device to perform the steps of:

dividing the target information into a plurality of terms at a predetermined position; and adding positional information to at least any of the factors contained in the terms resulting from the division and causing each of the terms resulting from the division to be held in any of a plurality of server devices, where the positional information contains an occurrence sequence of the terms in the target information and an occurrence sequence of the factors in the terms.

\* \* \* \* \*